(12) United States Patent　(10) Patent No.: US 8,301,934 B1
Ramesh et al.　(45) Date of Patent: Oct. 30, 2012

(54) COMMIT-TIME TIMESTAMPING OF TEMPORAL ROWS

(75) Inventors: Bhashyam Ramesh, Secunderabad (IN); Manjula Koppuravuri, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 816 days.

(21) Appl. No.: 12/425,692

(22) Filed: Apr. 17, 2009

(51) Int. Cl.
　　*G06F 11/00*　(2006.01)
(52) U.S. Cl. ............................ 714/18; 714/20
(58) Field of Classification Search .............. 714/18, 714/19, 20, 45, 46, 712, 814
See application file for complete search history.

(56) References Cited

U.S. PATENT DOCUMENTS

| | | | |
|---|---|---|---|
| 6,769,074 B2 * | 7/2004 | Vaitzblit ........................ | 714/16 |
| 7,606,791 B2 * | 10/2009 | Dettinger et al. .................. | 1/1 |
| 7,970,742 B2 * | 6/2011 | Hanckel et al. ............... | 707/673 |
| 8,010,554 B1 * | 8/2011 | Zhou ............................. | 707/769 |
| 2006/0288045 A1 * | 12/2006 | Raz ............................... | 707/200 |

OTHER PUBLICATIONS

Jensen, Christian S., et al., "Transaction Timestamping in (Temporal) Databases", *Proceedings of the 27th VLDB Conference*, (2001).
Lomet, David et al., "Transaction Time Support Inside a Database Engine", *Proceedings of the 22nd International on Data Engineering.*, (Apr. 2006).

* cited by examiner

*Primary Examiner* — Dieu-Minh Le
(74) *Attorney, Agent, or Firm* — Howard Speight

(57) ABSTRACT

A base table temporal row affected by a transaction is timestamped. The temporal row has a row ID. The temporal row in the base table is modified according to the transaction. The row ID for the modified temporal row is associated with an identifier for the transaction in a temporal work table. Upon committing the transaction: the temporal work table is searched to determine the row ID of the temporal row modified by the transaction, and a commit-time is saved into the temporal row identified by the row ID.

36 Claims, 5 Drawing Sheets

| | TransactionNumber (Byte(32)) | RowOperation Char(3) | Transaction Commit Time | RowIDs (VarByte) | | | |
|---|---|---|---|---|---|---|---|
| 505 — | TransactionNum1 | CVB | NULL | RID1 | RID2 | RID3 | |
| 510 — | TransactionNum1 | CVE | NULL | RID4 | RID5 | | |
| 515 — | TransactionNum1 | CTE | CommitTime | RID6 | RID7 | RID8 | RID9 |
| 520 — | TransactionNum1 | B | NULL | RID10 | | | |
| 525 — | TransactionNum2 | CTB | NULL | RID11 | | | |

COMMIT-TIME TIMESTAMPING OF TEMPORAL ROWS

BACKGROUND

A temporal transaction is a transaction in which a temporal table is modified. Rows in the temporal base table are timestamped when the row is modified in a transaction. For example, when a base table is defined as TransactionTime ("TT") table and a row in such a table is modified, the modified row is closed and timestamped by setting an ending bound of a TransactionTime column to current time and a copy of the row is made to record the modifications. The copied row is timestamped by setting a beginning bound of a TransactionTime column is set to current time. Some database transactions include multiple row operations. In some multi-transaction situations it is useful to avoid timestamping the modified rows in the temporal base table until the transaction is committed, which is a challenge.

SUMMARY

In general, in one aspect, the invention features a method for timestamping a base table temporal row affected by a transaction. The temporal row has a row ID. The method includes modifying the temporal row in the base table according to the transaction. The method further includes associating the row ID for the modified temporal row with an identifier for the transaction in a temporal work table. The method further includes, upon committing the transaction: searching the temporal work table to determine the row ID of the temporal row modified by the transaction, and saving a commit-time into the temporal row identified by the row ID.

Implementations of the invention may include one or more of the following. Modifying the temporal row in the base table according to the transaction may include processing a first update to the temporal row in the transaction by creating a new row that is a copy of the temporal row with the modification, setting a ending value in a Temporal Kilroy Bit in a ValidTime column in the temporal row, setting a beginning value in a Temporal Kilroy Bit in a ValidTime column in the new row, journaling the temporal row and the new row. Modifying the temporal row in the base table according to the transaction may further include processing a second update to the temporal row in the transaction by: recognizing from its Temporal Kilroy Bit that the new row is a modification to the temporal row in this transaction, and in response, modifying the new row and refraining from journaling the new row in response to the second update.

The transaction may have a row operation associated with it in the temporal work table. Saving the commit-time into the temporal row may include saving the commit-time into one or more of a group of temporal row fields based on the value of the row operation associated with the transaction according to the following list, in which the row operation is separated from the temporal table type by a colon, the temporal table type is separated from the locations where the commit-time is saved by a slash, and the location where the commit-time is saved are separated by commas:

CVB:valid time/ValidTime Begin Time;
CVB:bi-temporal/ValidTime Begin Time, Transaction-Time Begin Time;
CVE:valid time/ValidTime End Time;
CVE:bi-temporal/ValidTime End Time, TransactionTime Begin Time;
CTB:trans action time/TransactionTime Begin Time;
CTE:transaction time/TransactionTime End Time; and
B:valid time/none; where
CVB=commit time for ValidTime Begin;
CVE=commit time for ValidTime End;
CTB=commit time for TransactionTime Begin;
CTE=commit time for TransactionTime End;
B=bit.

ValidTime may be a period data type having a ValidTime Begin Time that defines the beginning of a time period and a ValidTime End Time that defines the end of the time period. TransactionTime may be a period data type having a TransactionTime Begin Time that defines the beginning of a time period and a TransactionTime End Time that defines the end of the time period.

Modifying the temporal row in the base table may include setting a flag. The actions taken upon committing the transaction may further include resetting the flag in the temporal row. Setting the flag may include setting a Temporal Kilroy Bit in one or more of a group of temporal row columns consisting of a ValidTime column and a TransactionTime column. Setting the flag may include setting one of a plurality of Temporal Kilroy Bits in the temporal row, each of the plurality of Temporal Kilroy Bits being a separate flag for a different operation that can be performed on the temporal row. Setting the flag may include setting a single Temporal Kilroy Bit in the temporal row. Committing the transaction may further include determining that an operation was performed on the temporal row by examining the Temporal Kilroy Bit and determining the operation that was performed on the temporal row by comparing the commit-time to a transaction begin time and a transaction end time in the temporal row. The method may further include resetting the flag in the temporal row by resetting one or more of the Temporal Kilroy Bits based on the value of a row operation associated with the transaction and the type of table according to the following, in which the row operation is separated from the temporal table type by a colon, the temporal table type is separated by the columns in which the Temporal Kilroy Bits are reset by a slash, and the columns in which the Temporal Kilroy Bits are reset are separated by commas:

CVB:valid time/ValidTime column;
CVB:bi-temporal/ValidTime column, TransactionTime column;
CVE:valid time/ValidTime column;
CVE:bi-temporal/ValidTime column, TransactionTime column;
CTB:transaction time/TransactionTime column;
CTE:transaction time/TransactionTime column; and
B:valid time/ValidTime column, TransactionTime column; where
CVB=commit time for ValidTime Begin;
CVE=commit time for ValidTime End;
CTB=commit time for TransactionTime Begin;
CTE=commit time for TransactionTime End; and
B=bit.

The method may further include creating the temporal work table as a sub-table of the base table. The method may further include saving the commit-time into the temporal work table row including the row ID for the temporal row modified by the transaction. Saving the commit-time into the temporal row identified by the row ID may be deferred. The commit-time that is saved may be the commit-time that was saved into the temporal work table row including the row ID for the temporal row modified by the transaction. The method may further include determining that executing the transaction would be more efficient if the temporal work is not accessed to commit the transaction and, in response not performing the searching and saving elements, searching the base table to find the temporal row, and saving the commit-time into the temporal row.

In general, in another aspect, the invention features a database system including one or more nodes. The database system further includes a plurality of CPUs, each of the one or more nodes providing access to one or more CPUs. The database system further includes a plurality of virtual processes, each of the one or more CPUs providing access to one or more virtual processes. Each virtual process is configured to manage data, including rows from the set of database table rows, stored in one of a plurality of data-storage facilities. The database system further includes a process configured to timestamp a base table temporal row affected by a transaction. The temporal row has a row ID. The process modifies the temporal row in the base table according to the transaction. The process further associates the row ID for the modified temporal row with an identifier for the transaction in a temporal work table. Upon committing the transaction, the process searches the temporal work table to determine the row ID of the temporal row modified by the transaction and saves a commit-time into the temporal row identified by the row ID.

In general, in another aspect, the invention features a computer program, stored in a computer-readable tangible medium, for timestamping a base table temporal row affected by a transaction. The temporal row has a row ID. The program includes executable instructions that cause a computer to modify the temporal row in the base table according to the transaction. The program further includes executable instructions that cause the computer to associate the row ID for the modified temporal row with an identifier for the transaction in a temporal work table. The program further includes executable instructions that cause the computer, upon committing the transaction, to search the temporal work table to determine the row ID of the temporal row modified by the transaction and save a commit-time into the temporal row identified by the row ID.

DETAILED DESCRIPTION

Figure 1:
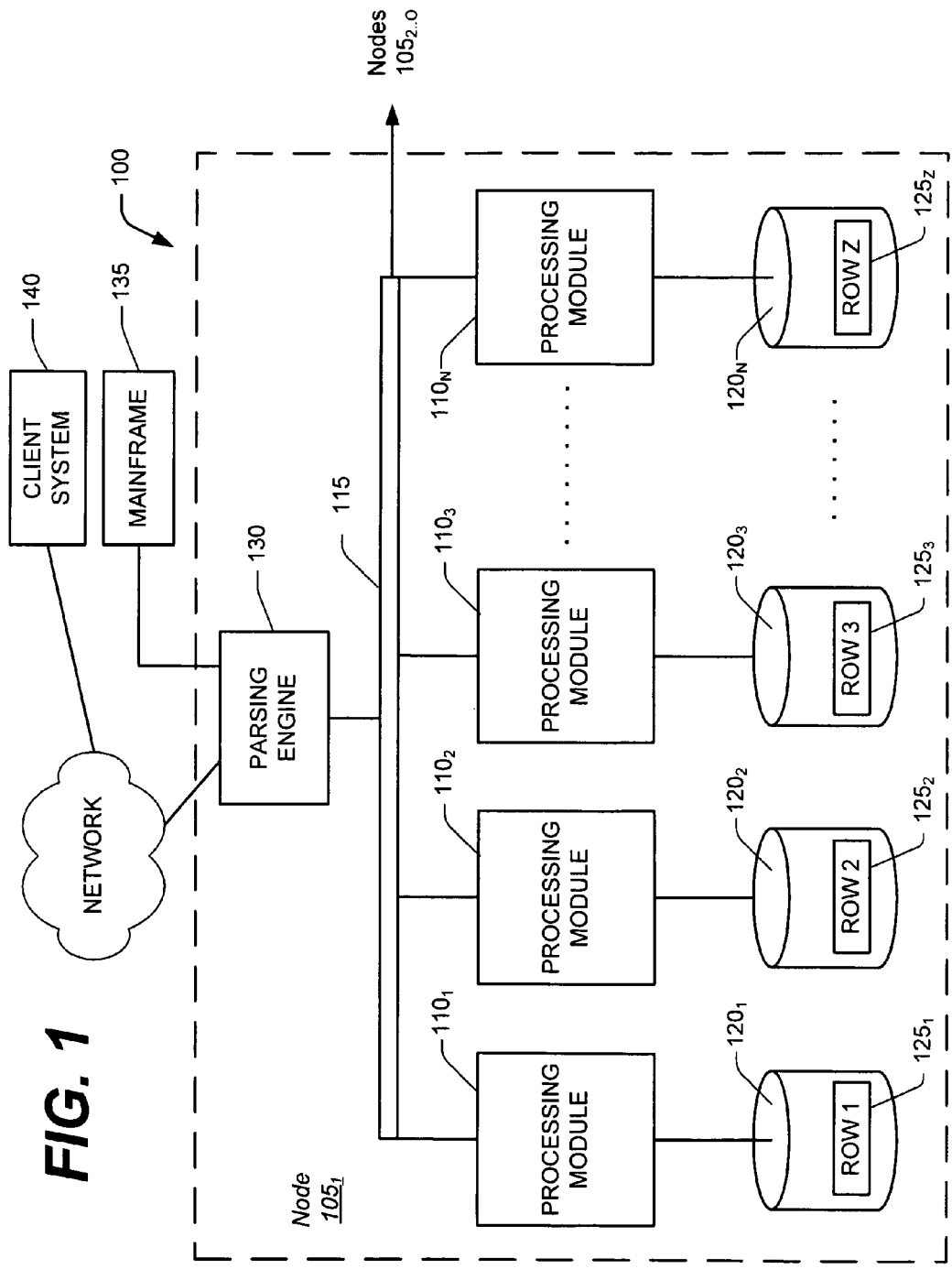
FIG. 1 is a block diagram of a node of a parallel processing database system.

The database row storage technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
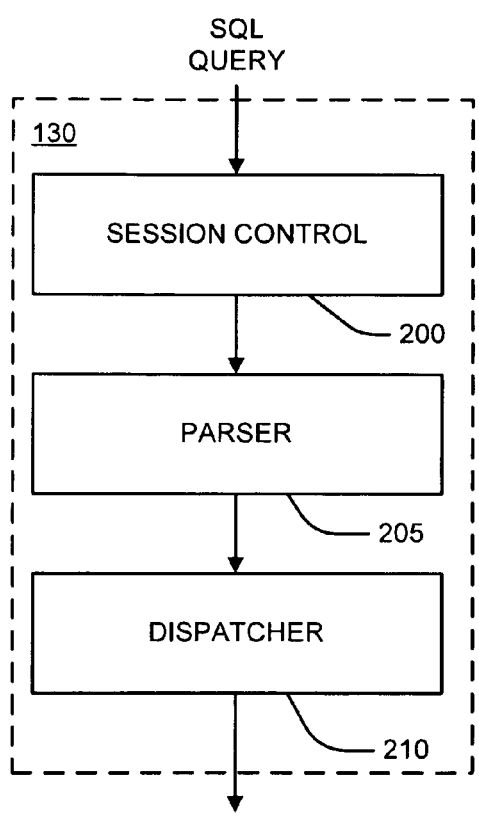
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
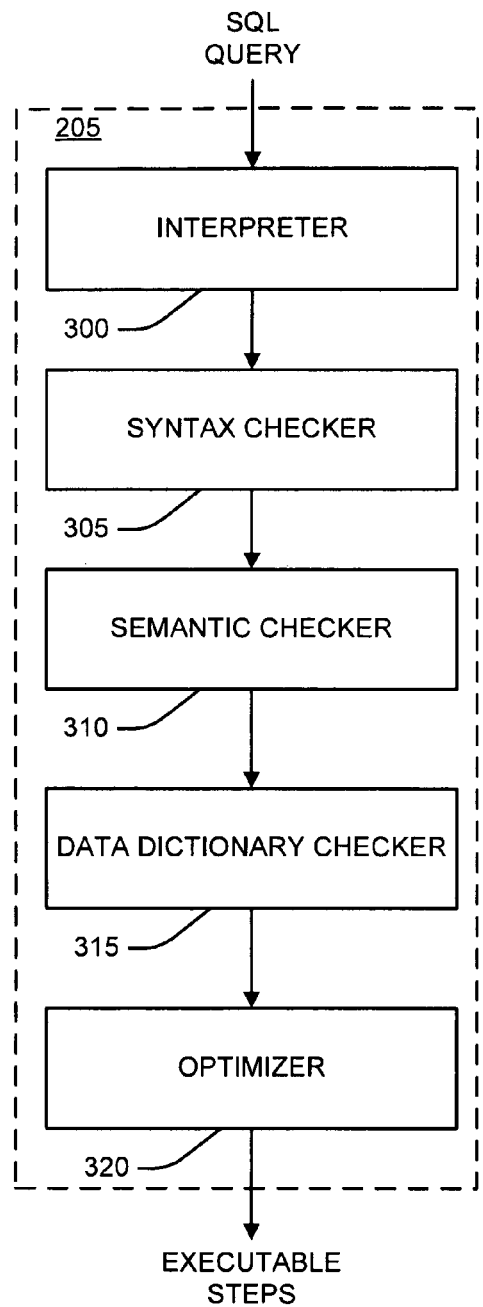
FIG. 3 is a block diagram of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_1 ... _N$ to implement the executable steps.

A temporal database management system is defined to be a database management system with built-in support for reasoning with time such as a temporal data model and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, it stores an inventory history or the movement of employees within an organization. While a conventional database can maintain temporal data, it is typically done using user-defined date or timestamp columns, or the like, which are maintained in a temporal manner.

In one embodiment, there are three different fundamental kinds of time in a temporal database. The first type is user-defined times that are un-interpreted time values. Such times typically are defined as DateTime data types or Period data types.

In one embodiment, DateTime data types are conventional types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world.

In one embodiment, the third fundamental kind of time in a temporal database is TransactionTime, which is typically defined as a Period data type with an element type of TIMESTAMP, and which is defined to denote the time period beginning when a fact was first known (or recorded in) the database and ending when superseded by an update to the fact or when the fact is deleted.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time.

A ValidTime table is defined to be a table that has ValidTime but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime.

A non-temporal table is defined to be a table that has neither ValidTime nor TransactionTime.

In one embodiment, as is conventional, there are three forms or variants of temporal statements: current, sequenced, and non-sequenced. A temporal statement of the current form is defined to be a statement that works with the current snapshot of data. A temporal statement of the sequenced form is defined to be a statement that considers the table as a sequence of snapshot states and works with each state of the data independently. A sequenced form can optionally specify the period of interest for the sequenced operation. This period of interest is called the period of applicability. A temporal statement of the non-sequenced type ignores the time dimensions for data and works across all the snapshot states simultaneously.

In one embodiment, a row in a ValidTime table can be a current row, a future row, or a history row. A current row is defined to be a row in which its ValidTime period overlaps current time. A future row is defined to be a row in which the begin time of its ValidTime period is in the future with respect to current time. A history row is defined to be a row in which the end time of its ValidTime is in the past with respect to current time. A valid row is defined to be a current row or a future row. A no-longer-valid row is defined to be a history row. A special case of ValidTime period being NULL is defined in which a row does not qualify as a current row, future row, or history row.

A row in a table with TransactionTime (i.e., a TransactionTime table or a bi-temporal table) can be an open row or a closed row. An open row is defined to be a row in which the TransactionTime end time is UNTIL_CLOSED. A closed row is a row in which the TransactionTime end time is not UNTIL_CLOSED (i.e., the row is closed in TransactionTime). In one embodiment, the UNTIL_CLOSED literal has a value associated with a time far in the future, such as the year 9999.

In a TransactionTime table, an open row is also called a current row and a closed row is also called a history row. In one embodiment, there is no concept of a future row in the TransactionTime dimension because the system maintains the TransactionTime column such that a TransactionTime begin time is never in the future and a TransactionTime end time is either UNTIL_CLOSED or in the past.

In one embodiment, a row in a bi-temporal table can be a current row, a future row, or a history row. A current row is defined to be an open row in which the ValidTime period overlaps current time. A future row is an open row in which the ValidTime begin time is in the future with respect to current time. A valid row is a row in which the ValidTime period overlaps current time or in which the ValidTime begin time is in the future with respect to current time. All rows that are either not open in TransactionTime or not valid in ValidTime are called history rows. An open but no-longer-valid row, a valid but closed row, and a neither valid nor open row are all history rows. In one embodiment, a row is not considered a current, future, or history row if the ValidTime period is null.

In one embodiment, all rows in a ValidTime table are considered to be open rows in the TransactionTime dimension and, therefore, the definition of a current, future, or history row is the same as for a bi-temporal table. Further, in one embodiment all rows in a TransactionTime table are considered to overlap current time in the ValidTime dimension and, therefore, the definition of a current or history row is the same as for a bi-temporal table. In addition, the definition of a valid or no-longer-valid row is the same for all three kinds of temporal tables.

A DML statement is defined to be a statement such as INSERT or UPDATE statements that adds, modifies, or deletes table rows, and does not include the SQL SELECT statement.

A current query (i.e., a SQL SELECT statement) or a current DML statement operates on the current rows of a table. A current constraint operates on current and future rows of a table.

In one embodiment, a database transaction is composed of one or more row operations. In one embodiment, a row operation is a DML statement. In one embodiment, once all of the row operations in a transaction are completed, a transaction "commit" occurs. In one embodiment, the transaction can be withdrawn until the commit occurs. In one embodiment, the commit step is an automatic last step in a transaction. In one embodiment, the commit step is not made without the intervention of an operator. In one embodiment, in a temporal transaction during the commit step the value of time at the time of commit (called hereafter commit-time) is used to timestamp the TransactionTime BEGIN or TransactionTime END value. In one embodiment, in a temporal transaction during the commit step the commit-time is used to timestamp the ValidTime BEGIN or ValidTime End value of the rows modified using a CURRENT DML. This process commit-time update is called timestamping. The timestamping process requires a revisit of the base table rows modified by the transaction that is being committed. This revisit is an expensive operation since rows must be read again and modified again. The techniques described in this application make this operation more efficient.

Figures 4, 5:
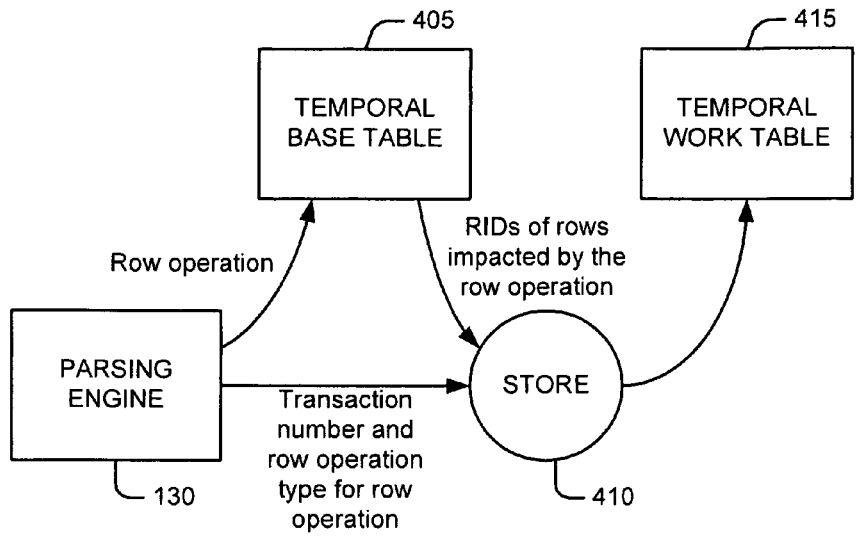
FIG. 4 is a data flow diagram showing the flow of data into a temporal work table.
FIG. 5 is an example of a temporal work table.

In one embodiment of a method for commit-time timestamping of temporal rows, illustrated in FIG. 4, the parsing engine 130 coordinates the execution of a database transaction, i.e., such as a DML statement, involving a plurality of row operations against a temporal base table 405. In one embodiment, as each row operation in a transaction is executed a process 410 records in a temporal work table ("TWT") 415 the row IDs ("RIDs") of the base table rows that are impacted by the row operation, the row operation type, and a transaction number associated with the transaction being executed. In general, the purpose of the TWT 415 is to identify which rows require revisiting. In one embodiment, the following types of row operation on the TWT (further defined below) exist:

CVB=commit-time for ValidTime Begin;
CVE=commit-time for ValidTime End;
CTB=commit-time for TransactionTime Begin;
CTE=commit-time for TransactionTime End; and
B=bit.

In one embodiment, the TWT 415 contains rows for each row operation, as indicated in FIG. 5. In one embodiment, the RIDs represent the rows in the base table that should be re-visited for commit-time updates. In one embodiment, the TransactionNumber column specifies the Transaction ID. In one embodiment, the RowOperation column records all the revisit operations that should be performed on the rows specified using the row IDs. In one embodiment, the Transaction-CommitTime column specifies the commit-time to be used for a deferred commit timestamping operation that can be performed after the transaction closes. The RowID column records the row IDs of the affected rows. In one embodiment, the TransationCommitTime column value of NULL specifies that the timestamping operation must be performed in line at the time of commit. In one embodiment, such a row may be deleted once the RIDs in the row are processed. In one embodiment, the RowOperation value determines whether the timestamping operation can be deferred.

In the example shown in FIG. 5, rows 505, 510, 515, and 520 represent row operations involved in TransactionNum1 as indicated in the TransactionNumber column. Row 525 represents a row operation involved in TransactionNum2. Row 505 represents a CVB row operation for which the transaction commit-time has not yet been set and which affected rows having row IDs RID1, RID2, and RID3. Row 510 represents a CVE row operation for which the transaction commit-time has not yet been set and which affected rows having row IDs RID4 and RID5. Row 515 represents a CTE row operation for which the transaction commit-time has been set and which affected rows having row IDs RID6, RID7, RID8, and RID9. Row 520 represents a B row operation for which the transaction commit-time has not yet been set and which affected a row having row ID RID10. Row 525 represents a CTB row operation for which the transaction commit-time has not yet been set and which affected a row having row ID RID11.

The Transaction Commit Time for row 515, which records data for a CTE row operation, is "CommitTime." This means that the Transaction Commit Time column of the TWT for this row will be filled in at commit-time and that the commit-time stored in this TWT row will be used to update the temporal rows identified by RID6, RID7, RID8, and RID9 at a deferred time, which means that this row 515 in the TWT cannot be deleted until that deferred time. The Transaction Commit Time for the other rows, rows 505, 510, 520, and 525, is set to NULL indicating that the timestamping operation must be performed in line at commit time and that those TWT rows can be deleted once the rows identified by the RIDs in those TWT rows are updated.

In one embodiment, the TWT 415 is a sub-table within the temporal base table 405. In one embodiment, there will be only one sub-table per table independent of the number of transactions. In one embodiment, if multiple transactions are in process, different rows for each transaction are recorded as is shown in FIG. 5 (i.e., rows 505, 510, 515, and 520 are recorded for TransactionNum1 and row 525 is recorded for TransactionNum2).

In one embodiment, DML statements are processed against the temporal base table 405 by modifying the rows in place in the temporal base table without copying them. In one embodiment, the modified rows in the temporal base table 405, illustrated in FIG. 6, have a marker bit 605 within the ValidTime ("VT") column and a marker bit 610 within the TransactionTime ("TT") column to indicate that the row has already been touched in this transaction. In one embodiment, there could be a separate marker bit for the BEGIN and END portions of the VT and TT columns to allow the operation to be determined without the use of temporal work table during a full table modification. In one embodiment, these bits are called Temporal Kilroy Bits.

Figure 6:
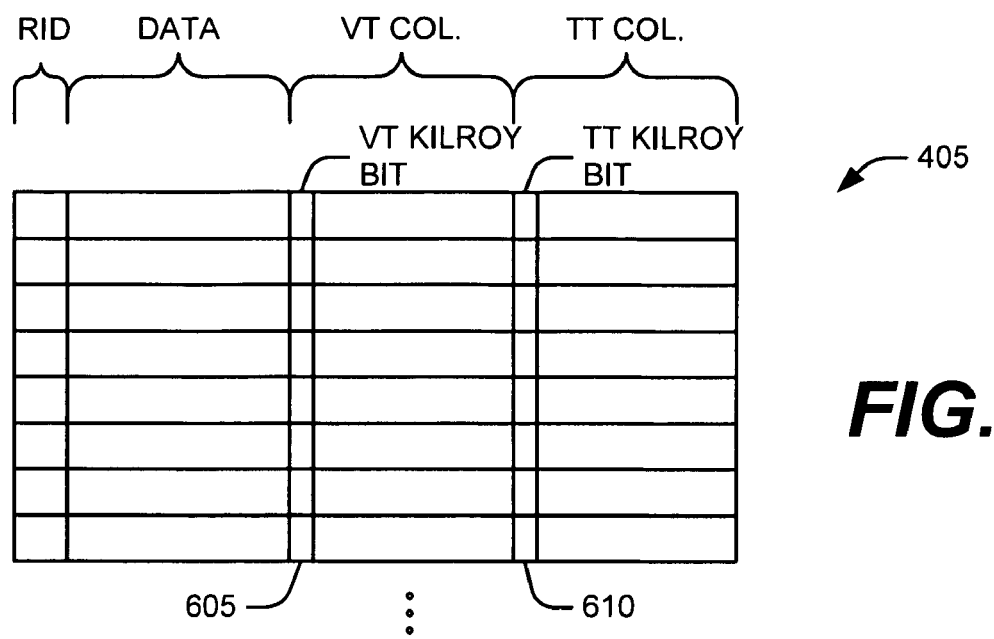
FIG. 6 is an example of a temporal base table with Temporal Kilroy Bits.
Figure 7:
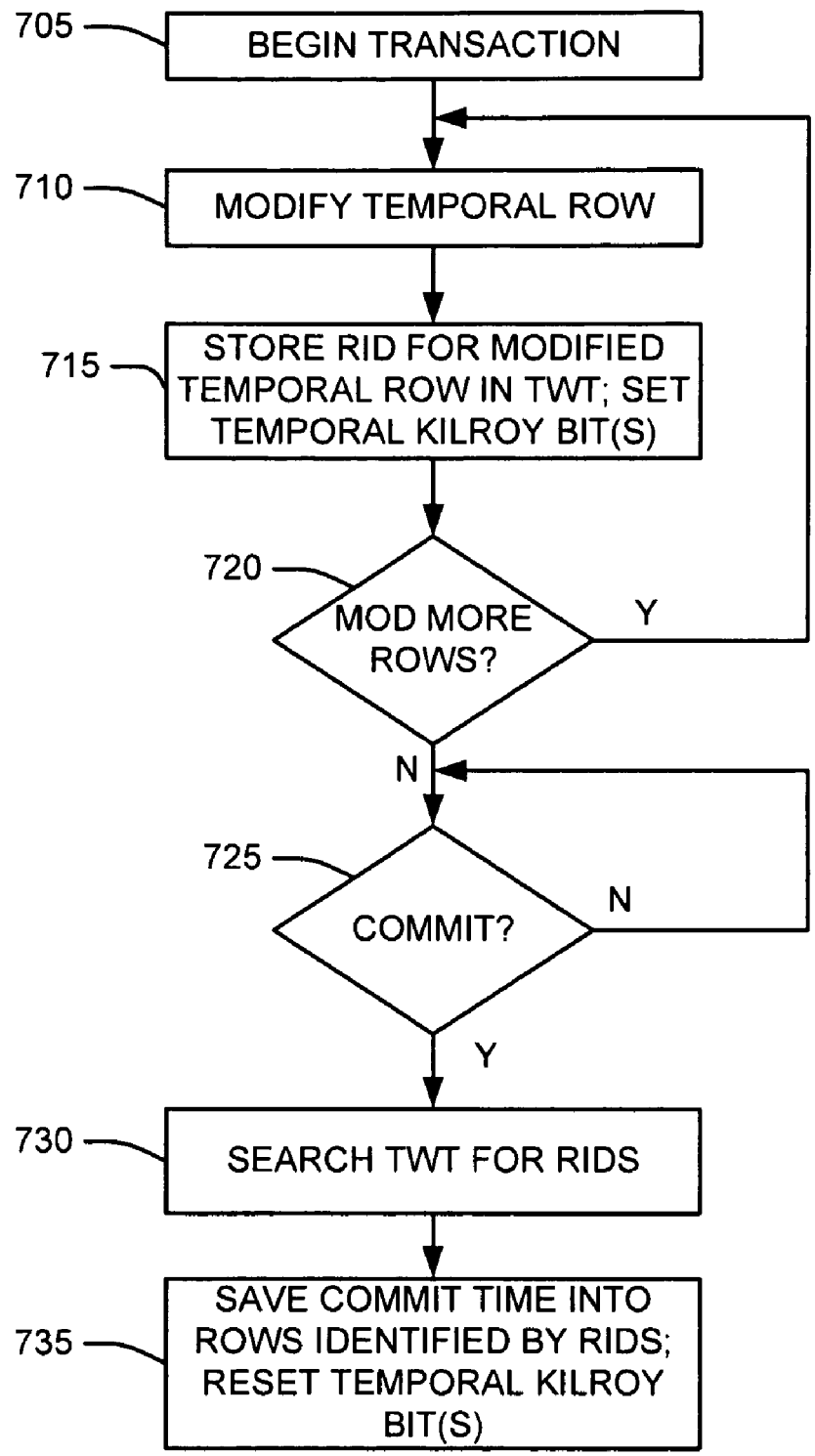
FIG. 7 is a flow chart for a method for commitment-time timestamping of temporal rows.

In one embodiment, when a RowID for a row in the temporal base table 405 is written to the temporal work table 415, the Temporal Kilroy Bit in the ValidTime and Transaction-Time columns is set. In one embodiment, during commit, the RIDs from the temporal work table are read and the corresponding base table rows are updated with the commit-time. Between the time that the temporal base table is updated and the time that the transaction is committed, the time columns are filled with the Transaction Begin Time. Note that FIG. 6 shows a bi-temporal table with both a ValidTime column and a TransactionTime column. In one embodiment, the same techniques are used with a ValidTime table having only a ValidTime column and no TransactionTime column and with a TransactionTime table having only a TransactionTime column and no ValidTime column.

In one embodiment, all DML operations on a Transaction-Time only or bi-temporal table will be handled as follows:
    for current, sequenced, non-sequenced DML operations:
        modify and insert RIDs for the impacted rows into the TWT 415. For example, in a TransactionTime only table an update can result in two rows: the old row with the TT time updated and a new row with the modified value OR the old row with the modified value and a new row with the old value but with the TT updated to indicate the commit time. The RIDs for the old row and the new row would be included in the TWT associated with the DML operation at least until commit-time.

In one embodiment, for ValidTime only tables, DML operations will be handled as:

For current DML operations: modify and insert impacted RIDs into the TWT 415;

For sequenced DML operations and non-sequenced DML operations: modify and no need for TWT modifications.

In one embodiment, if a DML operation in a transaction is submitted on rows that have already been affected by earlier DML operations in the same transaction, the Temporal Kilroy Bit(s) will be used to (a) identify the modified rows to do the operation in the same row in the case of a table with a TransactionTime dimension (that is, if multiple modifications to the same row in a table with a TransactionTime dimesion are made in the same transaction, then the Temporal Kilroy Bit(s) are used to avoid producing multiple versions of the modified row), (b) avoid journaling for the modification for a row that is already modified in the transaction.

In one embodiment, during commit time the following operations are performed: (a) read RIDs from TWT and (b) write commit-time into the time columns of the base table rows identified by the RIDs (c) unset the Temporal Kilroy Bit(s), and (d) delete the TWT row. In one embodiment, the row operation column of the TWT defines (a) the time column in the temporal base table 405 into which the commit time is to be written, and (b) the temporal Kilroy bit(s) to be unset.

In one embodiment, a RowOperation of "CVB" means that the Temporal Kilroy Bit should be unset in the ValidTime column and the commit-time should be written to the ValidTime Begin Time. In one embodiment, if the table is bi-temporal the bit in the TransactionTime Begin Time should also be unset and the commit-time should be written to the TransactionTime Begin Time. In one embodiment, the commit-time (in the Transaction Commit Time column) will not be recorded in this TWT row, as the base table row-ids are revisited during commit-time i.e., the commit timestamping is not deferred.

In one embodiment, a RowOperation of "CVE" means that the Temporal Kilroy Bit should be unset in the ValidTime column and the commit-time should be written to the ValidTime End Time. In one embodiment, if the table is bi-temporal the bit in the TransactionTime Begin Time should also be unset and the commit-time should be written to the TT Begin Time. In one embodiment, the commit-time will not be recorded in this TWT row, as the base table row-ids are revisited during commit-time i.e., the commit timestamping is not deferred.

In one embodiment, a RowOperation of "CTE" means that the Temporal Kilroy Bit should be unset in the TransactionTime column and the commit-time should be written to the TransactionTime End Time. Such rows, in which commit-time is written to the TransactionTime End Time, are closed in TransactionTime. In one embodiment, these rows are revisited on a deferred basis and the associated TWT row is only updated with the commit-time during commit processing.

In one embodiment, a RowOperation of "B" (bit) means that only the Temporal Kilroy Bit(s) in the base table row should be unset and no data will be written into the time columns. In one embodiment, a "B" RowOperation is used if the table that is being operated on has only ValidTime dimension and a sequenced operation is performed on the row. For a bi-temporal table or a TT only table close and open operations are handled by RowOperations that are not 'B'. In one embodiment, all newly created rows have their Temporal Kilroy Bits set. Generally, the Temporal Kilroy Bits are used to avoid journaling and, in some cases, to avoid versioning. In one embodiment, any row which does not require timestamping (i.e., a row that is not a current row or a row in which the TransactionTime value need to be set with the commit-time value) only needs to have its Temporal Kilroy Bits unset. In one embodiment, a given RID can be in a 'B' row and a 'CVB' or 'CVE' row if a sequenced DML operation that has a Period of Applicability overlapping CURRENTTIME is submitted first (causing a TWT row with a "B" RowOperation to be created) and then a current DML operation is submitted in the same transaction (causing a TWT row with RowOperation other than "B" to be created (i.e., a specific RID can be in more than one row in the TWT). The Temporal Kilroy bit in the base table row in such case is useful to avoid journaling for the later-submitted current DML. The frequency of such operations is assumed to be low and thus if the same RID is in the 'B' row, the overhead of such additional reads of the row is ignored. The commit-time will not be recorded in this TWT row.

In one embodiment, a RowOperation of "CTB" means that the Temporal Kilroy Bit should be unset in the TT column and also the commit-time should be written to the TransactionTime Begin Time. Rows with commit-time in TransactionTime Begin Time are open in TransactionTime. The commit-time will not be recorded in this TWT row, as the base table row-ids are revisited during commit processing.

In one embodiment, the Temporal Kilroy Bits 605, 610 is the most-significant-bit (MSB) of ValidTime and TransactionTime columns, respectively. In one embodiment both the BEGIN and END portions have their own Temporal Kilroy Bits. In one embodiment, with one Temporal Kilroy Bit and using the transaction begin time it can be determined whether the BEGIN or END has been modified. In one embodiment, the Temporal Kilroy Bit can be multiple bits to specify multiple operations such as "clear the bit" and "perform timestamp operation." In one embodiment, the Temporal Kilroy Bit(s) is set when rows are modified or inserted in a transaction. In one embodiment, it is used to avoid checking the TWT table when the same row is modified for a second or additional time within the same transaction and it is desired not to insert a new row in the temporal base table. In one embodiment, it is used to avoid journaling. In one embodiment, the time values in the ValidTime and TransactionTime columns will be set to Transaction Begin Time initially for all those rows that need to be set to the transaction commit time. In one embodiment, during re-visit time, the transaction commit-time is recorded.

At commit-time, all the 'CVB', 'CVE', 'CTB' and 'B' rows are read from the TWT and the appropriate Temporal Kilroy Bits are cleared and the commit-times are set in the appropriate columns of the row according to the value of the RowOperation column of that row. The row or rows associated with the just-committed transaction are deleted from TWT. A 'CTE' row is modified with commit-time and written back to the TWT.

In one embodiment, transaction numbers are not unique in the system. Since the 'CTE' row is a deferred row, in one embodiment it persists in the TWT 415 even after the transaction is committed. In one embodiment, it is possible that a transaction number will be duplicated when a newly initiated transaction has the same transaction number as that of an existing closed transaction (CTE) row. In one embodiment, such duplicate transactions numbers are differentiated by a non-NULL commit time in the TWT row created for the new transaction.

In one embodiment, when a query is submitted that reads history rows (sequenced in TransactionTime dimension or a non-sequenced query that either has a constraint on the TransactionTime dimension or projects the TransactionTime dimension value), the TWT table must be reconciled with the base table. In one embodiment, this is a pre-step that is generated by the optimizer. A reconcile implies that the TransactionTime End Time should be set to the commit-time for all rows specified in the 'CTE' row.

In one embodiment, if the optimizer recognizes that a large percentage of rows will be touched by the DML operation (such as in a full table update operation) then the TWT is not used and during commit the base table is scanned to unset the Temporal Kilroy Bit(s) and record the commit-time. In such an embodiment, deferring the timestamping of the closed rows is not possible and multiple Temporal Kilroy Bits may be used to differentiate between just unsetting the bit and performing the operations of unsetting the bit, timestamping with commit timestamp value, and determining whether the begin or the end time of the temporal column value must be timestamped.

In use, in one embodiment, when a transaction begins (block 705), a temporal row in the temporal base table 405 is modified according to the transaction (block 710). In one embodiment, the RID for the modified temporal row is then stored in the TWT so that it is associated with the transaction (block 715). For example, in FIG. 5, RID1 is stored in the TWT and is associated with a transaction identified as TransactionNum1 by being in the same row with that identifier. Similarly, RID2-RID10 are also associated with the same transaction. RID11 is associated with the transaction identified by TransactionNum2. At the same time, Temporal Kilroy Bit(s) are set in the affected rows. The Temporal Kilroy Bit(s) is checked as each temporal row is modified. If a Temporal Kilroy Bit for a temporal row is already set it is not necessary to add a new entry for the temporal row related to that transaction. In one embodiment, row locking techniques prevent two different transactions from making overlapping modifications to the same row. That is, if the Kilroy bit is set in a row by one transaction, a second transaction will not attempt to set (or reset) the Kilroy bit because the row will be locked by the first transaction. In one embodiment, modification of the temporal row and storing of the RID for the modified temporal row in the TWT is performed for all rows modified by the transaction (block 720).

In one embodiment, when that operation is complete, the system waits for the transaction to be committed (block 725). In one embodiment, during the wait time the database system processes other transactions. In one embodiment, at commit-time, the TWT is searched for RIDs associated with the transaction that has been committed (block 730). The commit-time is updated into rows of the temporal base table 405 identified by the RIDs identified in the search and the associated Temporal Kilroy Bit(s) is reset (block 735).

For example, consider a table with only ValidTime dimension. When a current modification is performed on a column (say column X) in a row (call this Row1) in the table, an update is performed to modify the ValidTime column value of Row1 and a new row (call this Row2) is created to record the modified value of column X and the new ValidTime value applicable for the row. Some combination of the images of Row1 and Row2 and the RIDs of Row1 and Row2 (e.g., the image of Row1 and the RID of Row2) are journalled in case the transaction is rolled back and the modification must be rolled back, i.e. to restore Row1 to its previous state and delete Row2. Furthermore, both of these rows are revisited during commit time in order to record the commit time timestamp value.

The goal is to make the re-visit of such rows in the table efficient. Therefore, in one embodiment, during the process of update and insert the system (a) sets a bit (e.g., a Temporal Kilroy Bit) in the ending value of ValidTime column for Row1, (b) sets a bit (also a Temporal Kilroy Bit) in the beginning value of ValidTime column in Row2, (c) records these RIDs into a Temporal Work Table so that commit time processing efficiently revisits the table using the RIDs.

Assume that another update is submitted on the same row in the same transaction. In that case, only Row2 qualifies for update since Row1 does not overlap current time. In one embodiment, because Row2 already has its temporal Kilroy bit(s) set, the system (a) recognizes that this is a row modified by this transaction, (b) modifies the row in-place and (c) avoids the need to journal the changes to Row2 as it was already journaled as part of the previous update operation (the Temporal Kilroy Bit indicates this). Thus, the Temporal Kilroy Bit helps to reduce journaling of multiple modifications to the same row in the same transaction.

The changes recorded in the roll-back journal are (a) a "before" image of Row1 (b) the RId of Row2 that is newly inserted. Assume in such a scenario, the transaction needs to be rolled back. Although the system performed multiple operations on Row2, in one embodiment, since the journal records only 2 operations, only these 2 operations are undone. Thus, the temporal Kilroy bit helps reduce the number of journal records for multiple modifications performed on the same set of rows.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for timestamping a base table temporal row affected by a transaction, the temporal row having a row ID, the method comprising:
  modifying the temporal row in the base table according to the transaction;
  associating the row ID for the modified temporal row with an identifier for the transaction in a temporal work table;
  upon committing the transaction:
  searching the temporal work table to determine the row ID of the temporal row modified by the transaction; and
  saving a commit-time into the temporal row identified by the row ID.

2. The method of claim 1 wherein:
  modifying the temporal row in the base table according to the transaction comprises:
   processing a first update to the temporal row in the transaction by:
    creating a new row that is a copy of the temporal row with the modification;
    setting a ending value in a Temporal Kilroy Bit in a ValidTime column in the temporal row;
    setting a beginning value in a Temporal Kilroy Bit in a ValidTime column in the new row;
   journaling the temporal row and the new row;
   processing a second update to the temporal row in the transaction by:
    recognizing from its Temporal Kilroy Bit that the new row is a modification to the temporal row in this transaction, and in response, modifying the new row and refraining from journaling the new row in response to the second update.

3. The method of claim 1 wherein the transaction has a row operation associated with it in the temporal work table and wherein saving the commit-time into the temporal row comprises saving the commit-time into one or more of a group of temporal row fields based on the value of the row operation associated with the transaction according to the following list, in which the row operation is separated from the temporal table type by a colon, the temporal table type is separated from the locations where the commit-time is saved by a slash, and the location where the commit-time is saved are separated by commas:

CVB:valid time/ValidTime Begin Time;
CVB:bi-temporal! ValidTime Begin Time, Transaction-Time Begin Time;
CVE:valid time/ValidTime End Time;
CVE:bi-temporal/ValidTime End Time, TransactionTime Begin Time;
CTB:trans action time/TransactionTime Begin Time;
CTE:transaction time/TransactionTime End Time; and
B:valid time/none; where
CVB=commit time for ValidTime Begin;
CVE=commit time for ValidTime End;
CTB=commit time for TransactionTime Begin;
CTE=commit time for TransactionTime End;
B=bit;
ValidTime is a period data type having a ValidTime Begin Time that defines the beginning of a time period and a ValidTime End Time that defines the end of the time period; and
TransactionTime is a period data type having a TransactionTime Begin Time that defines the beginning of a time period and a TransactionTime End Time that defines the end of the time period.

4. The method of claim 1 wherein modifying the temporal row in the base table comprises setting a flag.

5. The method of claim 4 wherein the actions taken upon committing the transaction further comprise:
resetting the flag in the temporal row.

6. The method of claim 4 wherein setting the flag comprises:
setting a Temporal Kilroy Bit in one or more of a group of temporal row columns consisting of a ValidTime column and a TransactionTime column.

7. The method of claim 4 wherein setting the flag comprises:
setting one of a plurality of Temporal Kilroy Bits in the temporal row, each of the plurality of Temporal Kilroy Bits being a separate flag for a different operation that can be performed on the temporal row.

8. The method of claim 4 wherein setting the flag comprises:
setting a single Temporal Kilroy Bit in the temporal row; and wherein committing the transaction further comprises:
determining that an operation was performed on the temporal row by examining the Temporal Kilroy Bit; and
determining the operation that was performed on the temporal row by comparing the commit-time to a transaction begin time and a transaction end time in the temporal row.

9. The method of claim 6 further comprising resetting the flag in the temporal row by resetting one or more of the Temporal Kilroy Bits based on the value of a row operation associated with the transaction and the type of table according to the following, in which the row operation is separated from the temporal table type by a colon, the temporal table type is separated by the columns in which the Temporal Kilroy Bits are reset by a slash, and the columns in which the Temporal Kilroy Bits are reset are separated by commas:

CVB:valid time/ValidTime column;
CVB:bi-temporal/ValidTime column, TransactionTime column;
CVE:valid time/ValidTime column;
CVE:bi-temporal/ValidTime column, TransactionTime column;
CTB:transaction time/TransactionTime column;
CTE:transaction time/TransactionTime column; and
B:valid time/ValidTime column, TransactionTime column; where
CVB=commit time for ValidTime Begin;
CVE=commit time for ValidTime End;
CTB=commit time for TransactionTime Begin;
CTE=commit time for TransactionTime End; and
B=bit.

10. The method of claim 1 further comprising:
creating the temporal work table as a sub-table of the base table.

11. The method of claim 1 further comprising:
saving the commit-time into the temporal work table row including the row ID for the temporal row modified by the transaction; and
wherein saving the commit-time into the temporal row identified by the row ID is deferred and the commit-time that is saved is the commit-time that was saved into the temporal work table row including the row ID for the temporal row modified by the transaction.

12. The method of claim 1 further comprising:
determining that executing the transaction would be more efficient if the temporal work is not accessed to commit the transaction and, in response:
not performing the searching and saving elements of claim 1;
searching the base table to find the temporal row; and
saving the commit-time into the temporal row.

13. A database system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows from the set of database table rows, stored in one of a plurality of data-storage facilities;
a process configured to timestamp a base table temporal row affected by a transaction, the temporal row having a row ID, by:
modifying the temporal row in the base table according to the transaction; associating the row ID for the modified temporal row with an identifier for the transaction in a temporal work table;
upon committing the transaction:
searching the temporal work table to determine the row ID of the temporal row modified by the transaction; and
saving a commit-time into the temporal row identified by the row ID.

14. The system of claim 13 wherein:
modifying the temporal row in the base table according to the transaction comprises:
processing a first update to the temporal row in the transaction by:
creating a new row that is a copy of the temporal row with the modification;
setting a ending value in a Temporal Kilroy Bit in a ValidTime column in the temporal row;

setting a beginning value in a Temporal Kilroy Bit in a ValidTime column in the new row;
journaling the temporal row and the new row;
processing a second update to the temporal row in the transaction by:
recognizing from its Temporal Kilroy Bit that the new row is a modification to the temporal row in this transaction, and in response, modifying the new row and refraining from journaling the new row in response to the second update.

15. The system of claim 13 wherein the transaction has a row operation associated with it in the temporal work table and wherein saving the commit-time into the temporal row comprises saving the commit-time into one or more of a group of temporal row fields based on the value of the row operation associated with the transaction according to the following list, in which the row operation is separated from the temporal table type by a colon, the temporal table type is separated from the locations where the commit-time is saved by a slash, and the location where the commit-time is saved are separated by commas:
CVB:valid time/ValidTime Begin Time;
CVB:bi-temporal! ValidTime Begin Time, TransactionTime Begin Time;
CVE:valid time/ValidTime End Time;
CVE:bi-temporal/ValidTime End Time, TransactionTime Begin Time;
CTB:transaction time/TransactionTime Begin Time;
CTE:transaction time/TransactionTime End Time; and
B:valid time/none; where
CVB=commit time for ValidTime Begin;
CVE=commit time for ValidTime End;
CTB=commit time for TransactionTime Begin;
CTE=commit time for TransactionTime End;
B=bit;
ValidTime is a period data type having a ValidTime Begin Time that defines the beginning of a time period and a ValidTime End Time that defines the end of the time period; and
TransactionTime is a period data type having a TransactionTime Begin Time that defines the beginning of a time period and a TransactionTime End Time that defines the end of the time period.

16. The system of claim 13 wherein modifying the temporal row in the base table comprises setting a flag.

17. The system of claim 16 wherein the actions taken upon committing the transaction further comprise:
resetting the flag in the temporal row.

18. The system of claim 16 wherein setting the flag comprises:
setting a Temporal Kilroy Bit in one or more of a group of temporal row columns consisting of a ValidTime column and a TransactionTime column.

19. The system of claim 16 wherein setting the flag comprises:
setting one of a plurality of Temporal Kilroy Bits in the temporal row, each of the plurality of Temporal Kilroy Bits being a separate flag for a different operation that can be performed on the temporal row.

20. The system of claim 16 wherein setting the flag comprises:
setting a single Temporal Kilroy Bit in the temporal row; and wherein committing the transaction further comprises:
determining that an operation was performed on the temporal row by examining the Temporal Kilroy Bit; and
determining the operation that was performed on the temporal row by comparing the commit-time to a transaction begin time and a transaction end time in the temporal row.

21. The system of claim 18 further comprising resetting the flag in the temporal row by resetting one or more of the Temporal Kilroy Bits based on the value of a row operation associated with the transaction and the type of table according to the following, in which the row operation is separated from the temporal table type by a colon, the temporal table type is separated by the columns in which the Temporal Kilroy Bits are reset by a slash, and the columns in which the Temporal Kilroy Bits are reset are separated by commas:
CVB:valid time/ValidTime column;
CVB:bi-temporal/ValidTime column, TransactionTime column;
CVE:valid time/ValidTime column;
CVE:bi-temporal/ValidTime column, TransactionTime column;
CTB:transaction time/TransactionTime column;
CTE:transaction time/TransactionTime column; and
B:valid time/ValidTime column, TransactionTime column; where
CVB=commit time for ValidTime Begin;
CVE=commit time for ValidTime End;
CTB=commit time for TransactionTime Begin;
CTE=commit time for TransactionTime End; and
B=bit.

22. The system of claim 13 further comprising:
creating the temporal work table as a sub-table of the base table.

23. The system of claim 13 further comprising:
saving the commit-time into the temporal work table row including the row ID for the temporal row modified by the transaction; and
wherein saving the commit-time into the temporal row identified by the row ID is deferred and the commit-time that is saved is the commit-time that was saved into the temporal work table row including the row ID for the temporal row modified by the transaction.

24. The system of claim 13 further comprising:
determining that executing the transaction would be more efficient if the temporal work is not accessed to commit the transaction and, in response:
not performing the searching and saving elements of claim 13;
searching the base table to find the temporal row; and
saving the commit-time into the temporal row.

25. A computer program, stored in a non-transitory computer-readable tangible medium, for timestamping a base table temporal row affected by a transaction, the temporal row having a row ID, the program comprising executable instructions that cause a computer to:
modify the temporal row in the base table according to the transaction;
associate the row ID for the modified temporal row with an identifier for the transaction in a temporal work table;
upon committing the transaction:
search the temporal work table to determine the row ID of the temporal row modified by the transaction; and
save a commit-time into the temporal row identified by the row ID.

26. The computer program of claim 25 wherein:
when modifying the temporal row in the base table according to the transaction the computer:
processes a first update to the temporal row in the transaction by:

creating a new row that is a copy of the temporal row with the modification; setting a ending value in a Temporal Kilroy Bit in a ValidTime column in the temporal row;

setting a beginning value in a Temporal Kilroy Bit in a ValidTime column in the new row;

journaling the temporal row and the new row;

processes a second update to the temporal row in the transaction by:

recognizing from its Temporal Kilroy Bit that the new row is a modification to the temporal row in this transaction, and in response, modifying the new row and refraining from journaling the new row in response to the second update.

27. The computer program of claim 25 wherein the transaction has a row operation associated with it in the temporal work table and wherein when saving the commit-time into the temporal row, the computer saves the commit-time into one or more of a group of temporal row fields based on the value of the row operation associated with the transaction according to the following list, in which the row operation is separated from the temporal table type by a colon, the temporal table type is separated from the locations where the commit-time is saved by a slash, and the location where the commit-time is saved are separated by commas:

CVB:valid time/ValidTime Begin Time;
CVB:bi-temporal! ValidTime Begin Time, TransactionTime Begin Time;
CVE:valid time/ValidTime End Time;
CVE:bi-temporal/ValidTime End Time, TransactionTime Begin Time;
CTB:trans action time/TransactionTime Begin Time;
CTE:transaction time/TransactionTime End Time; and
B:valid time/none; where
CVB=commit time for ValidTime Begin;
CVE=commit time for ValidTime End;
CTB=commit time for TransactionTime Begin;
CTE=commit time for TransactionTime End;
B=bit;
ValidTime is a period data type having a ValidTime Begin Time that defines the beginning of a time period and a ValidTime End Time that defines the end of the time period; and
TransactionTime is a period data type having a TransactionTime Begin Time that defines the beginning of a time period and a TransactionTime End Time that defines the end of the time period.

28. The computer program of claim 25 wherein when modifying the temporal row in the base table, the computer sets a flag.

29. The computer program of claim 28 wherein the actions taken upon committing the transaction further comprise:
resetting the flag in the temporal row.

30. The computer program of claim 28 wherein setting the flag comprises:
setting a Temporal Kilroy Bit in one or more of a group of temporal row columns consisting of a ValidTime column and a TransactionTime column.

31. The computer program of claim 28 wherein setting the flag comprises:
setting one of a plurality of Temporal Kilroy Bits in the temporal row, each of the plurality of Temporal Kilroy Bits being a separate flag for a different operation that can be performed on the temporal row.

32. The computer program of claim 28 wherein when setting the flag the computer:
sets a single Temporal Kilroy Bit in the temporal row; and
wherein when committing the transaction the computer further:
determines that an operation was performed on the temporal row by examining the Temporal Kilroy Bit; and
determines the operation that was performed on the temporal row by comparing the commit-time to a transaction begin time and a transaction end time in the temporal row.

33. The computer program of claim 30 further comprising executable instructions that cause the computer to reset the flag in the temporal row by resetting one or more of the Temporal Kilroy Bits based on the value of a row operation associated with the transaction and the type of table according to the following, in which the row operation is separated from the temporal table type by a colon, the temporal table type is separated by the columns in which the Temporal Kilroy Bits are reset by a slash, and the columns in which the Temporal Kilroy Bits are reset are separated by commas:

CVB:valid time/ValidTime column;
CVB:bi-temporalNalidTime column, TransactionTime column;
CVE:valid time/ValidTime column;
CVE:bi-temporalNalidTime column, TransactionTime column;
CTB:transaction time/TransactionTime column;
CTE:transaction time/TransactionTime column; and
B:valid time/ValidTime column, TransactionTime column; where
CVB=commit time for ValidTime Begin;
CVE=commit time for ValidTime End;
CTB=commit time for TransactionTime Begin;
CTE=commit time for TransactionTime End; and
B=bit.

34. The computer program of claim 25 further comprising executable instructions that cause the computer to:
create the temporal work table as a sub-table of the base table.

35. The computer program of claim 25 further comprising executable instructions that cause the computer to:
save the commit-time into the temporal work table row including the row ID for the temporal row modified by the transaction; and
wherein saving the commit-time into the temporal row identified by the row ID is deferred and the commit-time that is saved is the commit-time that was saved into the temporal work table row including the row ID for the temporal row modified by the transaction.

36. The computer program of claim 25 further comprising executable instructions that cause the computer to:
determine that executing the transaction would be more efficient if the temporal work is not accessed to commit the transaction and, in response:
not perform the searching and saving elements of claim 25;
search the base table to find the temporal row; and
save the commit-time into the temporal row.

* * * * *